(12) United States Patent
Hartikainen et al.

(10) Patent No.: US 6,931,253 B1
(45) Date of Patent: Aug. 16, 2005

(54) METHOD AND AN ARRANGEMENT FOR MANAGEMENT OF BEARERS

(75) Inventors: Jari Hartikainen, Kerava (FI); Timo Perälä, Helsinki (FI); Pekka Marjelund, Espoo (FI); Pekka Kohonen, Espoo (FI); Timo Kauhanen, Kirkkonummi (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/744,180

(22) PCT Filed: Jul. 22, 1999

(86) PCT No.: PCT/FI99/00636

§ 371 (c)(1),
(2), (4) Date: Mar. 30, 2001

(87) PCT Pub. No.: WO00/05913

PCT Pub. Date: Feb. 3, 2000

(30) Foreign Application Priority Data

Jul. 23, 1998 (FI) ........................................ 981653

(51) Int. Cl.[7] ............................................... H04Q 7/20
(52) U.S. Cl. ...................... 455/450; 455/453; 455/512
(58) Field of Search ................................. 455/512, 513, 455/514, 450, 452.1, 452.2, 453

(56) References Cited

U.S. PATENT DOCUMENTS

| | | | | |
|---|---|---|---|---|
| 5,636,223 A | * | 6/1997 | Reardon et al. ............ | 370/431 |
| 5,729,542 A | * | 3/1998 | Dupont ........................ | 370/346 |
| 5,742,592 A | * | 4/1998 | Scholefield et al. ......... | 370/329 |
| 6,192,248 B1 | * | 2/2001 | Solondz ....................... | 455/450 |
| 6,256,497 B1 | * | 7/2001 | Chambers ................... | 455/433 |
| 2001/0046863 A1 | * | 11/2001 | Rinne et al. ................. | 455/442 |

FOREIGN PATENT DOCUMENTS

| | | |
|---|---|---|
| EP | 0717579 A2 | 6/1996 |
| WO | WO 97/11566 | 3/1997 |

OTHER PUBLICATIONS

""Call-Level" and "Burst-Level", Priorities For An Effective Management Of Multimedia Services In UMTS", Iera et al., Proceedings IEEE INFOCOM '96, The Conference on Computer Communications.

"Transport And Control Issues In Multimedia Wireless Networks", Iera et al., Wireless Networks, vol. 2, 1996.

* cited by examiner

Primary Examiner—Sonny Trinh
Assistant Examiner—Sam Bhattacharya
(74) Attorney, Agent, or Firm—Perman & Green, LLP

(57) ABSTRACT

The invention is directed to a method for management of bearers in cellular telecommunication systems in such a situation, when the demand of services is greater than the capacity of the network to provide such services. According to the invention, a set of priority values is associated with each bearer. Preferably, the set of priority values comprises an absolute priority value, which is the same for all bearers associated with a certain USIM, and a relative priority value, which defines the priority order of the bearers associated with a certain USIM. The network uses these priority values to determine, which bearer is dropped, when not enough resources are available.

16 Claims, 3 Drawing Sheets

METHOD AND AN ARRANGEMENT FOR MANAGEMENT OF BEARERS

This application claims the benefit of the earlier filed International Application No. PCT/FI99/00636, International Filing Date, 22 Jul. 1999, which designated the United States of America, and which international application was published under PCT Article 21(2) in English as WO Publication No. WO 00/05913.

TECHNICAL FIELD OF THE INVENTION

The invention is directed to a method and an arrangement for management of bearers in cellular telecommunication systems in such a situation, when the demand of services is greater than the capacity of the network to provide such services.

BACKGROUND OF THE INVENTION

For clarification of common terms used in this document, an overview of certain cellular telecommunication system configurations is presented in the following.

Proposals for third-generation systems include UMTS (Universal Mobile Telecommunications System) and FPLMTS/IMT-2000 (Future Public Land Mobile Telecommunications System/International Mobile Telecommunications at 2000 MHz). In these plans cells are categorised according to their size and characteristics into pico-, nano-, micro- and macrocells, and an example of the service level is the bit rate. The bit rate is the highest in picocells and the lowest in macrocells. The cells may overlap partially or completely and there may be different terminals so that not all terminals necessarily are able to utilise all the service levels offered by the cells.

FIG. 1 shows a version of a future cellular radio system which is not entirely new compared with the known GSM system but which includes both known elements and completely new elements. In current cellular radio systems the bottleneck that prevents more advanced services from being offered to the terminals comprises the radio access network RAN which includes the base stations and base station controllers. The core network of a cellular radio system comprises mobile services switching centres (MSC), other network elements (in GSM, e.g. SGSN and GGSN, i.e. Serving GPRS Support Node and Gateway GPRS Support node, where GPRS stands for General Packet Radio Service) and the related transmission systems. According e.g. to the GSM+ specifications developed from GSM the core network can also provide new services.

In FIG. 1, the core network of a cellular radio system 930 comprises a core network CN 931 which has three parallel radio access networks linked to it. Of those, net-works 932 and 933 are UMTS radio access networks and network 934 is a GSM radio access network. The upper UMTS radio access network 932 is e.g. a commercial radio access network, owned by a telecommunications operator offering mobile services, which equally serves all subscribers of said telecommunications operator. The lower UMTS radio access network 933 is e.g. private and owned e.g. by a company in whose premises said radio access network operates. Typically the cells of the private radio access network 933 are nano- and/or picocells in which only terminals of the employees of said company can operate. All three radio access networks may have cells of different sizes offering different types of services. Additionally, cells of all three radio access networks 932, 933 and 934 may overlap either entirely or in part. The bit rate used at a given moment of time depends, among other things, on the radio path conditions, characteristics of the services used, regional overall capacity of the cellular system and the capacity needs of other users. The new types of radio access networks mentioned above are called generic radio access networks (GRAN). Such a network can co-operate with different types of fixed core networks CN and especially with the GPRS network of the GSM system. The generic radio access network (GRAN) can be defined as a set of base stations (BS) and radio network controllers (RNC) that are capable of communicating with each other using signaling messages. Below, the generic radio access network will be called in short a radio network GRAN.

The terminal 935 shown in FIG. 1 is preferably a so-called dual-mode terminal that can serve either as a second-generation GSM terminal or as a third-generation UMTS terminal according to what kind of services are available at each particular location and what the user's communication needs are. It may also be a multimode terminal that can function as terminal of several different communications systems according to need and the services available. Radio access networks and services available to the user are specified in a subscriber identity module 936 (SIM) connected to the terminal.

In UMTS specifications, a SIM is denoted with the term USIM (UMTS SIM). One mobile communication means (ME, mobile equipment) such as a cellular telephone can have more than one USIM connected to the terminal. This is useful, for example, for providing a person with a private telephone number with a first USIM and another number for work-related calls with a second USIM. The person can then receive calls to all of these telephone numbers with the same ME comprising the two USIMs, and bar any calls to any of these telephone numbers at his/her leisure. For example, the person can bar any calls to the work-related number at weekends and allow only calls to his/her private number. The USIMs may be separate IC cards, whereby the ME is required to have more than one USIM connector for connecting the USIMs, or a single IC card may comprise more than one logical USIMs.

In cellular telecommunication systems a single speech connection or data connection through the cellular telecommunication network is called a bearer. Generally, a bearer is associated with a set of parameters pertaining to data communication between a certain terminal equipment and a network element, such as a base station or an interworking unit (IWU) connecting the cellular network to another telecommunications network. The set of parameters associated with a bearer comprises typically for example data transmission speed, allowed delays, allowed bit error rate (BER), and the minimum and maximum values for these parameters. A bearer may further be a packet transmission bearer or a circuit switched bearer and support for example transparent or non-transparent connections. A bearer can be thought of as a data transmission path having the specified parameters connecting a certain mobile terminal and a certain network element for transmission of payload information. One bearer always connects only one mobile terminal to one network element. However, a bearer can pass through a number of network elements. One mobile communication means (ME, Mobile Equipment) may in some cellular telecommunication systems support one bearer only, in some other systems also more than one simultaneous bearers.

One old problem in cellular telecommunication systems is how to handle situations, in which the demand of services at some area in a cellular telecommunication system exceeds the capability of the cellular telecommunication system to provide such services. This problem is more severe in the UMTS system presently under development and other systems, where a mobile communication means (ME) can have more than one simultaneus connections i.e. bearers. A method is needed for determining, which current bearers are dropped or which new bearers are allowed in an overload situation.

One example of a typical overload situation is the handover of a connection to a crowded cell. One conventional way of handling this situation is simply to refuse the handover, which may result in a broken connection. The situation is more complicated, if the ME has several connections, and the new cell has spare capacity for only a subset of those connections. In such a situation, a method is needed for selecting which connections are serviced and which connections are refused.

One further example of a problematic situation is such a situation, when the capacity of a cell is already in full use, and one ME requests for example an increase in data transmission rate or a group of new bearers.

SUMMARY OF THE INVENTION

An object of the invention is to alleviate problems associated with cell overload situations. A further object of the invention is to realize a method for selection of bearers, which are to be denied of service in an overload situation. An object of the invention is also to realize a method for priorizing of bearers.

The objects are reached by defining a multilevel priority scheme for bearers, which allows flexible allocation of resources for bearers having widely differing parameters.

The method according to the invention for management of bearers in a cellular telecommunications system is characterized by that at least two priority data items are associated with each bearer, and decisions whether or not to provide services for a bearer are based at least in part on the value of at least one of said at least two priority data items.

The cellular telecommunications system according to the invention is characterized by that for management of bearers at least two priority data items are arranged to be associated with each bearer, and decisions whether or not to provide services for a bearer are arranged to be based at least in part on the value of at least one of said at least two priority data items.

A radio network controller according to the invention for a cellular telecommunications system is characterized by that for management of bearers it comprises means for associating at least two priority data items with each bearer, and means for making decisions whether or not to provide services for a bearer based at least in part on the value of at least one of said at least two priority data items.

The dependent claims describe further advantageous embodiments of the invention.

The invention relates to alleviating problems in those situations, where a radio access network cannot support all present or requested bearers. According to the invention, a set of priority values is associated with each bearer. Preferably, the set of priority values comprises an absolute priority value, which is the same for all bearers associated with a certain USIM, and a relative priority value, which defines the priority order of the bearers associated with a certain USIM. The network uses these priority values to determine, which bearer is dropped, when not enough resources are available.

BRIEF DESCRIPTION OF THE DRAWINGS

The invention is described in more detail in the following with reference to the accompanying drawings, of which

Same reference identifiers are used for similar entities in the figures.

DETAILED DESCRIPTION

According to an advantageous embodiment of the invention, a two-level priority scheme is used. For each client identity, an absolute priority value is assigned, and for each bearer, a relative priority value. Such a two-level priority scheme using two priority data items allows on the one hand treatment of all bearers of a client identity as a single unit on a client-by-client basis, and on the other hand treatment of all bearers of all client identities on a bearer-by-bearer basis.

Treatment of all bearers of a client identity as a single unit can be effected by using only one of the priority values as the basis for bearer servicing decisions. Preferably, the absolute priority associated with the client identity is used as the basis for decisions. Treatment of all bearers of a client identity as a single group is useful e.g. in handover situations, when the network decides, whether or not to allow a handover to occur.

In some situations it is advantageous to prioritize the use of transmission capacity on a bearer-by-bearer basis. In such cases, both the absolute and the relative prioritization can be used for selecting the bearers to be dropped first. Advantageously, those bearers which have the lowest relative priority of the client identitites having lowest absolute priority, are dropped first. Such an approach is advantageous for example in air interface congestion situations.

The client identity referred to in the previous paragraphs is in an advantageous embodiment of an invention the identity of a single USIM, as the following examples in the description of various figures of this specification show. However, the invention is not limited to such an embodiment. A client identity can also comprise multiple USIMs. For example, a client identity may also refer to a single ME having multiple USIMs, whereby the client identity comprises multiple USIM identities.

The absolute priority value of each USIM may advantageously be stored in the USIM. The absolute priority value may be different between different USIMs, also in cases where a single ME comprises more than one USIMs. Further, an operator may set the price of an USIM according to the absolute priority level of the USIM. The absolute priority is preferably the same for all bearers associated with the same USIM. The relative priority value can advantageously be used to distinguish the bearers associated with the same USIM. This relative priority value of each bearer can advantageously be assigned automatically during the setup of the bearer, for example, by the call control entity for that particular USIM.

Figure 2:
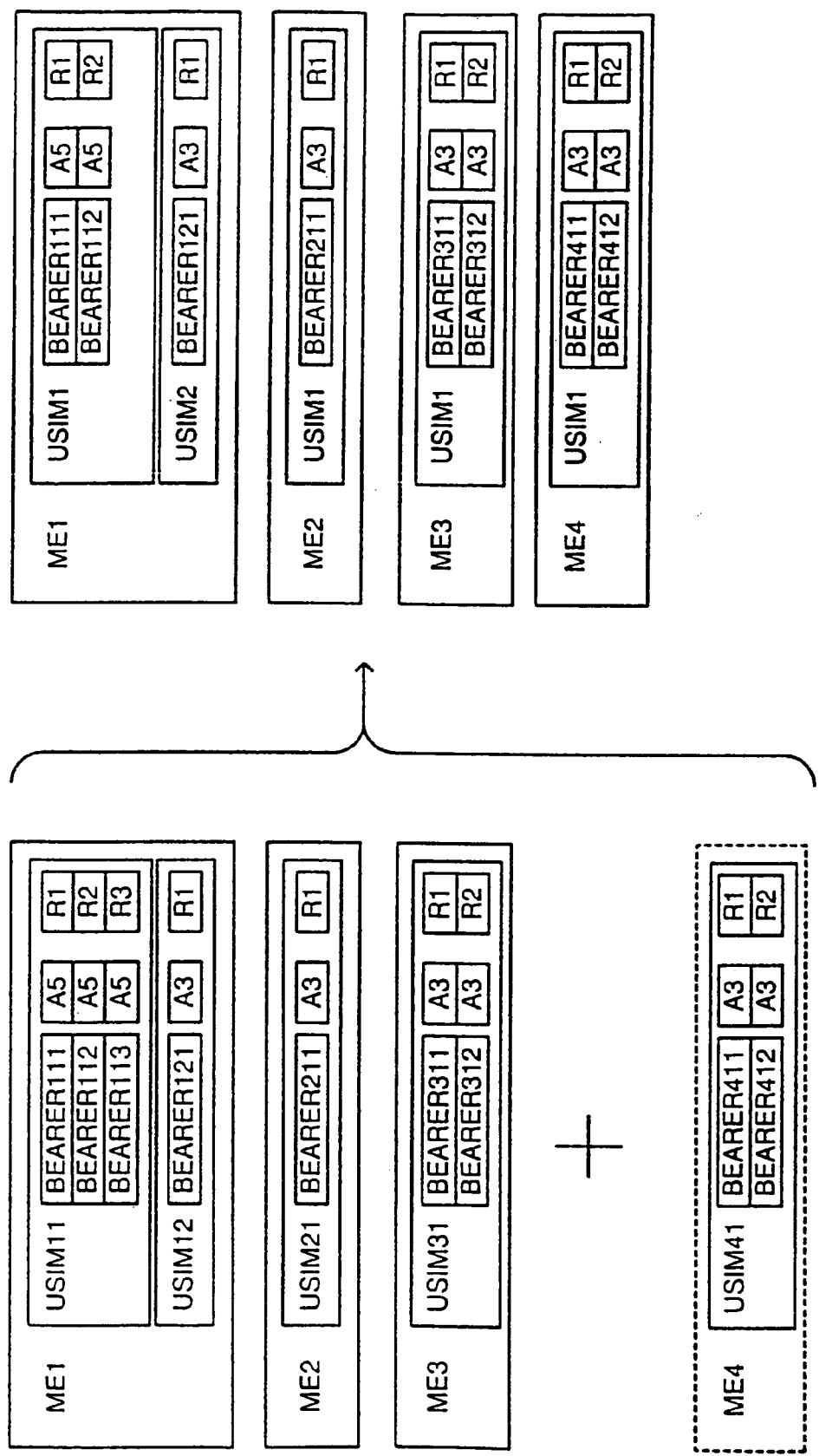
FIG. 2 illustrates one example of selection of bearers to be serviced according to an advantageous embodiment of the invention.

FIG. 2 illustrates selection of serviced bearers according to an advantageous embodiment of the invention. FIG. 2 shows three mobile communication means ME1,ME2,ME3 which already have connections to a base station. In this example, we assume that the base station is able to support eight bearers. As shown in FIG. 2, the first mobile ME1 has two USIMs USIM11, USIM12, the second mobile ME2 one USIM USIM21 and the third mobile ME3 one USIM USIM31. In the initial situation as shown by the left side of the figure, the first mobile ME1 has four bearers, three of the bearers associated with the first USIM USIM11 and one with the second USIM USIM12. The second mobile ME2 has only one bearer, and the third mobile ME3 two bearers. The bearers have two priority levels, the higher level called the absolute priority A3,A5 being associated with the USIM and the lower level called the relative priority R1,R2,R3 being associated with each bearer. As one can see from FIG. 2, the three bearers associated with USIM11 have the lowest absolute priority value A5, while the other bearers have a middle priority of A3. In the example of FIG. 2, it is assumed that the absolute priority values range from A1 to A5, the latter being the lowest priority.

The range of priority values is not limited in any way by the present invention. The range may comprise more or less than five values, and the order of priority values may be different from that explained in the previous paragraph.

At this initial situation, a fourth mobile ME4 is switched on, and the user of ME4 wishes to start communication using two bearers for example to have a video telephone call. Consequently, ME4 signals a request to the network to set up two bearers. Alternatively, ME4 could represent a mobile moving from another cell towards the cell servicing ME1, ME2, and ME3, and require a handover.

The USIM of ME4 has the absolute priority level A3 associated with it. Upon reception of the request, the network examines the bearer situation of the base station and finds out, that only one more bearer can be accommodated. Since two bearers were requested, one bearer must be denied service, either one of the requested bearers or one of currently serviced bearers. In this case, there are three currently active bearers having a lower absolute priority value than the requested bearers, namely the bearers of ME1 associated with the first USIM USIM11 of ME1. Consequently, the network decides to drop the bearer having the lowest relative priority value among the three bearers BEARER111, BEARER112, BEARER113 of USIM11, thereby creating free capacity to accommodate the requested two new bearers of ME4. As a result, the bearer situation of the base station becomes as shown in the right side of FIG. 2.

The selection of bearers may in various embodiments of the invention be different from that shown in the example of FIG. 2. In one advantageous embodiment of the invention where all bearers of a client identity such as a USIM are treated in a single group, all bearers of the first USIM USIM11 of ME1 are dropped instead of only one as shown in FIG. 2, since they have the lowest absolute priority value of all active bearers and bearer requests.

Advantageously, each USIM has an associated default absolute priority level, which is assigned to each new bearer. In further advantageous embodiments of the invention, a user can change the priority settings of his/her connections to ensure that he/she receives the desired service from the network. Naturally, the network operator may change the charges levied per connection time or per transmitted amount of data as a result of change of priority settings. Advantageously, the user may change the absolute priority level of any of his/her USIMs, and the relative priority level of any active bearer. Further, the user may change the default priority levels, or the desired priority level for the next connection requested. In further advantageous embodiments, the user may change the priorities of currently active bearers during the connection. Changing of priority of currently active bearers is advantageous for example when the user is downloading a large file to the ME, and wishes to speed up the process by temporarily increasing the priority of the bearer.

On the other hand, the network may start to select the bearers to be serviced for many reasons. For example, when the air interface becomes congested at a so called hot spots, for example during mass events when large crowds of people are present at one location, the network may increase the required priority levels to cope with the overload. A further example is a decrease of the capacity of a base station due to e.g. malfunctioning of a transmitter of the base station.

In an overload situation, the network may offer a possibility to the user to choose to increase the priority level and accept higher connection charges in order to avoid termination of his/her connections. In an advantageous embodiment of the invention, the user may set default preferences for his/her USIMs specifying, if and within which limits the priority levels of the user's connections may be automatically changed during overload situations.

In various embodiments of the invention, the user may adjust any of the priority values. The user may, for example, increase the absolute priority values to increase the service level of all of his bearers. Naturally, the network operator may adjust the charges accordingly.

In one advantageous embodiment, the operator may set a required minimum priority for a certain cell or for any number of cells or even for the whole network, which minimum priority must be matched or exceeded in order to obtain any service from the network.

In another advantageous embodiment of the invention, the bearer request does not contain an explicit indication of a priority. Instead, the network chooses the priority based on the information contained in the bearer request, for example the type of bearer requested. For example, if the user requests an expensive service, the network chooses a relatively high priority to be used for that bearer.

Figure 1:
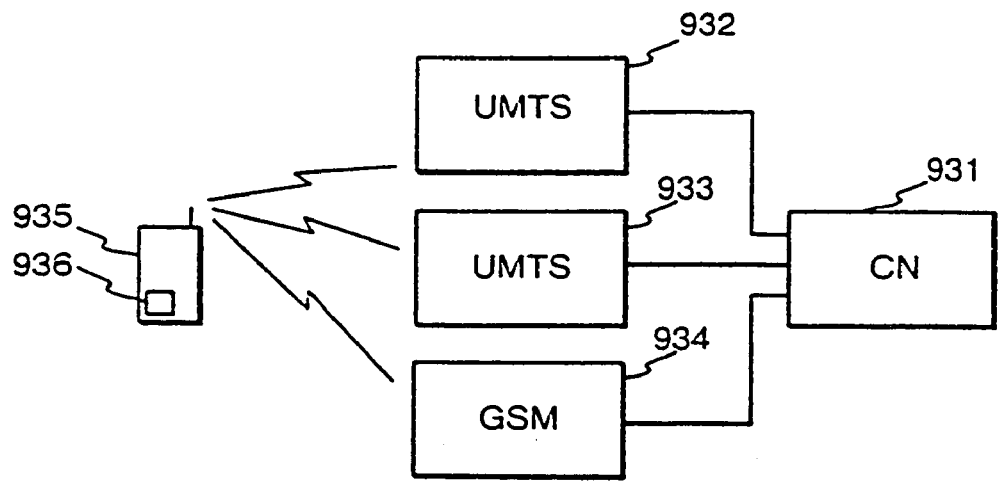
FIG. 1 illustrates the general structure of a cellular telecommunication network according to prior art.
Figure 3:
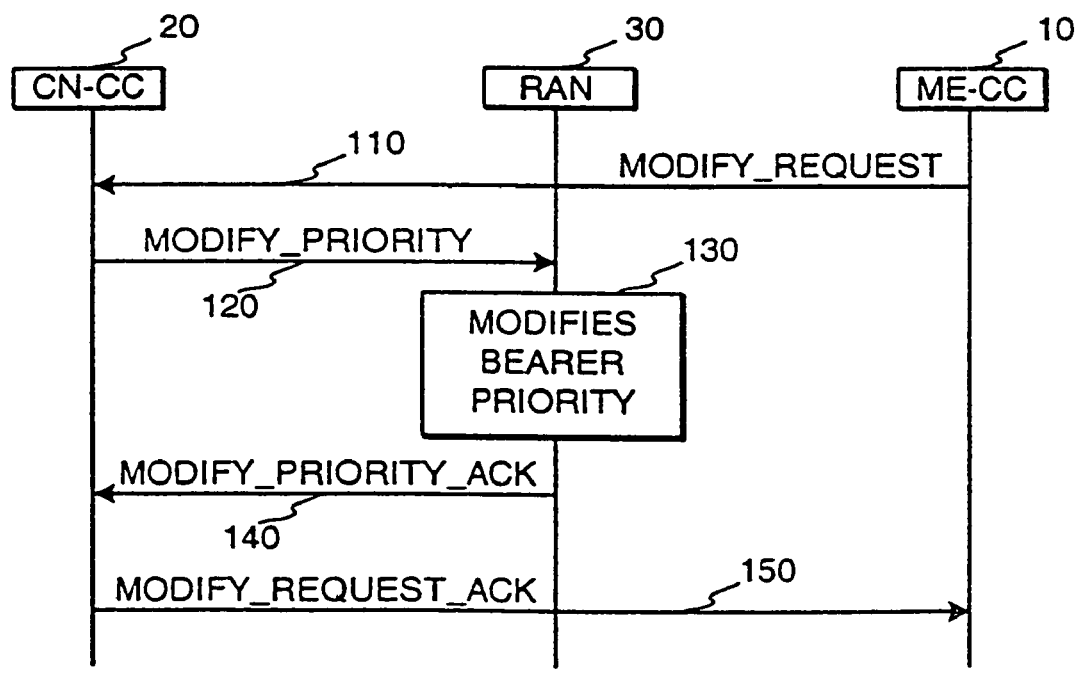
FIG. 3 illustrates one example of signalling according to an advantageous embodiment of the invention.

As previously described, a user may advantageously change the priority values during a connection. For example, during a multimedia session different multimedia components, each one forming a separate bearer, are often added or removed, whereby the preferences given at call setup may no longer correspond to the current wish of the user. The user may therefore wish to modify the relative priority of his/her bearers. One example of a signalling procedure for priority modification according to an advantageous embodiment of the invention is shown in FIG. 3. THE connections are controlled by the Call Control (CC) entities in the core network. The decisions on whether or not to provide radio service for a bearer are made in the radio access network RAN. The priority values are stored in the RAN. FIG. 3 shows the signalling between a call control entity ME-CC 10 in a mobile communication means, a corresponding peer entity CN-CC 20 in the core network, and the radio access network RAN 30. After the user instructs the mobile communication means to increase the priority of a bearer, the ME-CC 10 sends a MODIFY_REQUEST message 110 to the CN-CC 20. The CN-CC invokes a priority modification procedure in the radio access network RAN 30 by sending a MODIFY_PRIORITY message 120 to the radio access network RAN 30. After receiving the MODIFY_PRIORITY command, the radio access network modifies 130 the priority of the bearer as desired. When the radio access network has completed the priority modification, it sends 140 an acknowledgement MODIFY_PRIORITY_ACK message back to CN-CC. The CN-CC finishes the messaging by sending 150 an acknowledgement MODIFY_REQUEST_ACK message to ME-CC.

A terminal can modify several bearers substantially simultaneously by initiating the negotiation procedure separately for each bearer in succession. In another advantageous embodiment, a list of bearer identities is attached as a parameter to the MODIFY REQUEST message.

Figure 4:
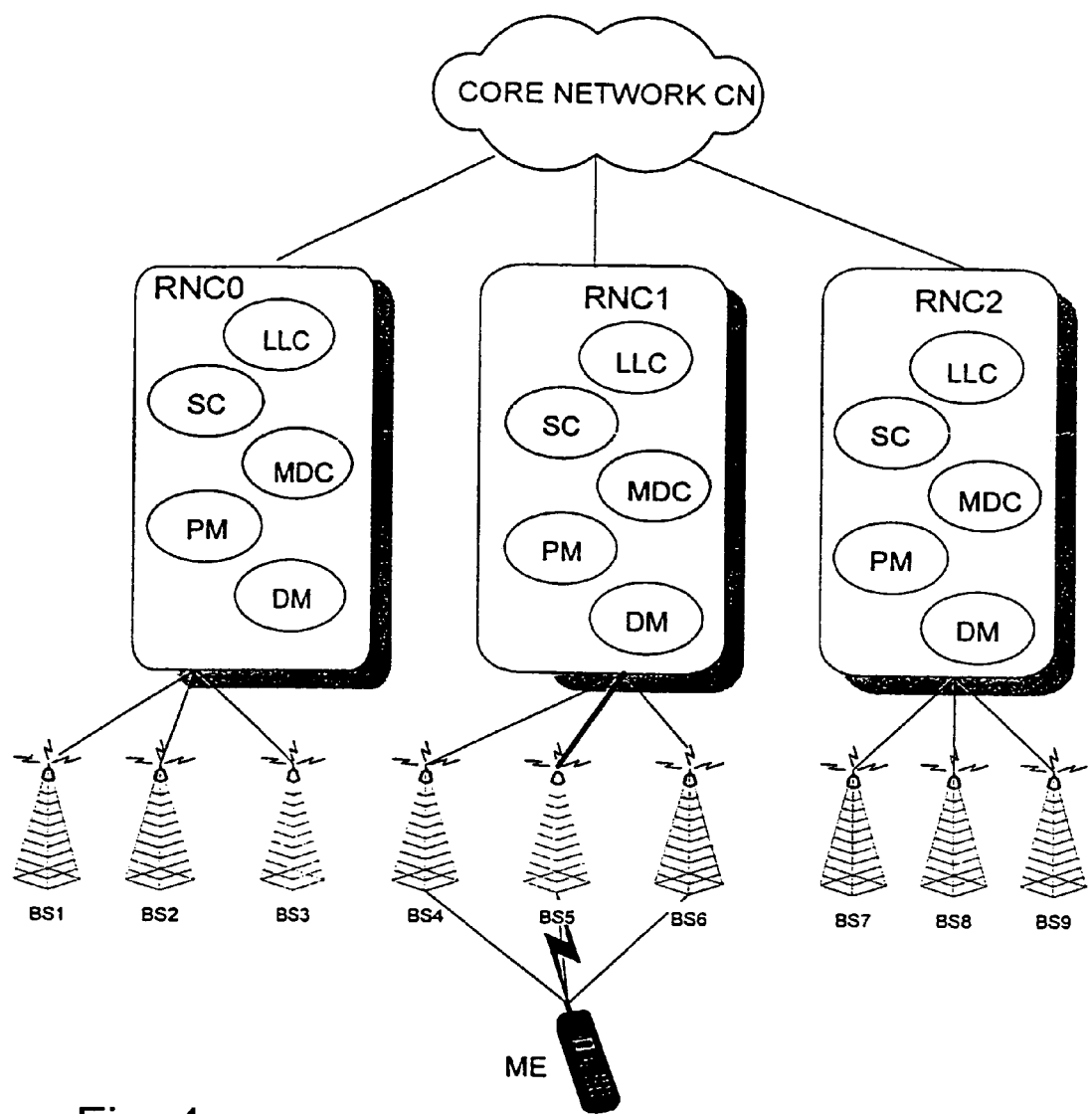
FIG. 4 illustrates one example of a telecommunications system and a radio network controller according to the invention.

FIG. 4 shows an example of a telecommunications system and a radio network controller according to the invention. The radio network comprises radio network controllers RNC1, RNC2 and RNC3. Base stations BS1, BS2 and BS3 are controlled by the radio network controller RNC0, base stations BS4, BS5 and BS6 re controlled by the radio network controller RNC1, and base stations BS7, BS8 and BS9 are controlled by the radio network controller RNC2. A mobile equipment ME is connected by radio to the system, via the base stations and radio network controllers. In FIG. 4 the base station BS5 is active, ie. the data transfer between the system and the mobile equipment is routed via the base station BS5. There can also be several active base stations, if macro diversity is used. It should be noted that FIG. 4 shows only a fraction of the usual number of radio network controllers and base stations in a radio network.

The radio network controller may comprise the following logical units. The logical link control LLC controls the radio connections between the radio network controller and a mobile equipment. The tasks of the logical link control LLC may include error detection, error correction and retransmission in error situations. In addition, the logical link control LLC may comprise control for the necessary buffers and acknowledge windows. The macrodiversity controller MDC performs the functions that belong to macrodiversity combining according to the possible macrodiversity implementation used. The set controller SC controls the active set of base stations. The radio network controller according to the invention also comprises means PM for associating priority data items with a bearer, and means DM for making decisions whether or not to provide services for the bearer based on the value of the priority data items. The means PM and DM can be realized as parts of other logical means of the radio network controller, or they can be separate logical means in the radio network controller.

The invention is not limited to using a two-level priority scheme as explained in the previous examples. For example, in an advantageous embodiment of the invention, a three-level priority scheme is used, i.e. three priority data items are associated with each bearer. In such an embodiment, the highest level priority value is associated with the ME, the middle level priority value is associated with each USIM connected with the ME, and the lowest level priority value is associated with the bearers of the USIMs. In such an embodiment, the selection of bearers to be serviced may proceed in a way analogous to the selection in a two-level scheme, e.g. starting the dropping of bearers from that group of bearers which has lowest values of the two higher priority levels, and dropping first those bearers having the lowest bearer-associated priority level. Further, a three-level priority scheme is advantageous for example when a ME comprising more than one USIM attempts to perform a handover to another cell. In such a situation it is advantageous, that all bearers of the ME can be treated as a single group when the network determines, whether or not to allow the handover to occur. In such a situation the ME advantageously has a priority value associated to it, which value is used by the network in said determination.

The priority scheme according to the invention can also be used in other situations than network overload situations. For example, instead of affecting the selection of bearers denied or allowed, the priorities may also affect the service level such as transmission capacity allocated for a bearer. For example, by setting the priority levels of his bearers high enough, the user may obtain better and faster service than other users with lower priority levels. With the inventive priority scheme, a user may obtain almost any service level he desires, and can adjust the obtained service level at any time by adjusting the priority values. The priority scheme further allows the network to reduce the level of service given to bearers having low priority, and thus avoid an overload situation altogether.

The name of a given functional entity, such as the radio network controller, is often different in the context of different cellular telecommunication systems. For example, in the GSM system the functional entity corresponding to a radio network (RNC) is the base station controller (BSC). Further, the various command names such as the MODIFY_REQUEST command name are intended to be examples only, and the invention is not limited to using the command names recited in this specification.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

What is claimed is:

1. A method for management of bearers in a cellular telecommunications system, characterized in that
   at least two priority data items are associated with each bearer, the first one of the priority data items having a same value for at least two bearers associated under the same client identity,
   decisions whether or not to provide services for a bearer are based at least in part on the value of at least one of said at least two priority data items,
   bearers are organized into sets on at least two hierarchical levels and a priority data item is given for each set, and
   all bearers associated with the same client identity have the same values of a first priority data item of said at least two priority data items; and
   wherein when considering the denial of services between first and second bearers, the service is denied for the bearer with a lower value of the first priority data item, disregarding their values of a second priority data item, unless the bearers have the same value for the first priority data item, then the service is denied for the bearer with a lower value of a second priority data item.

2. A method according to claim 1, characterized in that one of the hierarchical levels is the level of one bearer, and the sets on that level comprise one bearer.

3. A method according to claim 1, characterized in that one of the hierarchical levels is the level of client identity, and the sets on that level comprise the bearers of that client identity.

4. A method according to claim 1, characterized in that
at least two sets of decisions on providing service are defined,
a first combination of the priority data items is used in a first set and
a second combination of the priority data items is used in a second set.

5. A method according to claim 1, characterized in that the value of the first priority data item is stored in the USIM.

6. A method according to claim 1, characterized in that said client identity is the identity of a USIM.

7. A method according to claim 1, characterized in that at least one of the priority data items is allocated during the bearer setup procedure.

8. A method according to claim 1, characterized in that at least one priority data item is changed during the connection.

9. A method according to claim 7, characterized in that the priority data item is determined by the mobile station.

10. A method according to claim 7, characterized in that the priority data item is determined by the network.

11. A method according claim 1 in a telecommunications system comprising a radio access network, a core network and a mobile equipment wherein
the decisions on whether or not to provide the radio service for the connection are made in the radio access network and
the priority items are stored in the radio access network characterized in that
the mobile equipment sends the core network entity controlling the bearer a request to change the value of a priority data item and the core network requests the radio access network to change the value of the priority data item.

12. A method according to claim 1, characterized in that at least a required minimum value for a priority data item is defined and the bearers having a priority data item value smaller than the required minimum priority value are not given resources.

13. A cellular telecommunications system, characterized in that for management of bearers
at least two priority data items are arranged to be associated with each bearer, the first one of the priority data items having a same value for at least two bearers associated under the same client identity, decisions whether or not to provide services for a bearer are arranged to be based at least in part on the value of at least one of said at least two priority data items,
bearers are organized into sets on at least two hierarchical levels and a priority data item is given for each set, and
all bearers associated with the same client identity have the same values of a first priority data item of said at least two priority data items,
wherein when considering the denial of services between first and second bearers, the service is denied for the bearer with a lower value of the first priority data item, disregarding their values of a second priority data item, unless the bearers have the same value for the first priority data item, then the service is denied for the bearer with a lower value of a second priority data item.

14. A cellular telecommunications system according to claim 13, characterized in that
at least two sets of decisions on providing service are defined,
a first combination of the priority data items is used in a first set and
a second combination of the priority data items is used in a second set.

15. A radio network controller for a cellular telecommunications system, characterized in that for management of bearers it comprises
means for associating at least two priority data items with each bearer, the first one of the priority data items having a same value for at least two bearers associated under the same client identity,
means for making decisions whether or not to provide services for a bearer is based at least in part on the value of at least one of said at least two priority data items; and
wherein bearers are organized into sets on at least two hierarchical levels and a priority data item is given for each set, and all bearers associated with the same client identity have the same values of a first priority data item of said at least two priority data items; and
further wherein when considering the denial of services between first and second bearers, the service is denied for the bearer with a lower value of the first priority data item, disregarding their values of a second priority data item, unless the bearers have the same value for the first priority data item, then the service is denied for the bearer with a lower value of a second priority data item.

16. A radio network controller according to claim 15, characterized in that it comprises
means for defining at least two sets of decisions on providing service,
means for using a first combination of the priority data items in a first set and
means for using a second combination of the priority data items in a second set.

* * * * *